United States Patent [19]
Kohlberg

[11] Patent Number: 5,980,258
[45] Date of Patent: Nov. 9, 1999

[54] MATHEMATICAL TEACHING APPARATUS AND METHOD

[76] Inventor: Elon Kohlberg, 122 Brattle St., Cambridge, Mass. 02138

[21] Appl. No.: 08/936,931

[22] Filed: Sep. 25, 1997

Related U.S. Application Data

[63] Continuation-in-part of application No. 08/752,639, Nov. 19, 1996, Pat. No. 5,749,734.

[51] Int. Cl.$^6$ .............................. G09B 19/02; G09B 23/02
[52] U.S. Cl. ........................... 434/195; 434/205; 434/208
[58] Field of Search .................................... 434/194, 195, 434/196, 204, 205, 207, 208

[56] References Cited

U.S. PATENT DOCUMENTS

| | | |
|---|---|---|
| 1,532,011 | 3/1925 | Williamson . |
| 1,826,034 | 10/1931 | Williamson . |
| 1,836,870 | 12/1931 | Quer ........................................ 434/195 |
| 2,680,306 | 6/1954 | Moyer ..................................... 434/195 |
| 3,229,388 | 1/1966 | Smith ...................................... 434/195 |
| 3,235,975 | 2/1966 | Pierson . |
| 4,585,419 | 4/1986 | Rinaldelli ............................ 434/195 X |
| 4,838,794 | 6/1989 | Coddington ......................... 434/195 X |
| 5,683,252 | 11/1997 | Tsao ........................................ 434/195 |

FOREIGN PATENT DOCUMENTS 2296596  3/1996  United Kingdom .

*Primary Examiner*—John A. Ricci
*Attorney, Agent, or Firm*—Dike, Bronstein, Roberts & Cushman, LLP; George W. Neuner

[57] ABSTRACT

A mathematical teaching apparatus comprising block elements that fit inside a block element container. The block element container will not close until the proper number of block elements are inserted. For teaching counting and addition concepts for a number base, such as base ten, a user will quickly grasp the concepts of grouping an arbitrary number of block elements into units, such as ones, tens and hundreds. A container for holding block element containers is also provided. The block elements and containers have the same shape, and maintain a proportional ratio with each other. All block elements and containers are counted and grouped using a counting devices which provide an indication of the number of units of each type present. The counting devices also signal when ten block elements or ten block element containers are inserted, signaling to a user that the block elements or containers should be inserted into a next-larger size container. A method of teaching using the mathematical apparatus is also presented. The mathematical teaching apparatus allows children to learn the concepts of number magnitude, addition and subtraction, including carrying and borrowing. A computer program implementing these ideas can also be used to present the mathematical concepts.

32 Claims, 10 Drawing Sheets

MATHEMATICAL TEACHING APPARATUS AND METHOD

This application is a continuation-in-part of U.S. patent application Ser. No. 08/752,639 filed on Nov. 19, 1996 now U.S. Pat. No. 5,749,734.

BACKGROUND

"The ingenious method of expressing all numbers by means of ten symbols, each symbol receiving a value of position as well as an absolute value . . . appears so simple to us now that we ignore its true merits. But its very simplicity puts our arithmetic in the first rank of useful inventions . . . remember, it escaped the genius of Archimedes and Apollonius." —Laplace Fundamental mathematical concepts are very difficult to grasp. Although most adults use numbers and mathematics daily in performing activities, the underlying concepts are difficult to learn. Children often require several years to master the premise of recognizing that numbers represent a numerical quantity for a group of real world objects. Further, these abstract numerical quantities can be added and subtracted, which correspond to the number of real objects represented by the numerical quantity.

The grouping of numbers into fields such as hundreds, tens and ones is an abstraction within itself. In the decimal representation, numerical quantities are grouped into sets of singles, tens and hundreds units (and continues into thousands, etc.), allowing any size numerical quantity to be represented with a number. The idea that ten ones is the same as one ten is fairly straightforward, but changes resulting from addition and multiplication can be troublesome. Children must understand that adding single units can affect the tens or even hundreds units of a number.

Subtraction requires an even greater abstraction for children to master. When performing subtraction on two numbers, if the second number has a unit place larger than the first number, the child must "borrow" from the next higher unit of the first number to obtain enough units to perform the subtraction. This concept of borrowing from a higher unit is difficult to grasp. Schools often teach the borrowing process by rote, without allowing the students to truly understand what is going on.

Several teaching blocks and rod systems have been widely used. These sometimes are used for demonstration, but when children use the block systems on their own, there is no feature of the blocks or rods to show a correct solution to a problem. The child can group the blocks or rods in any fashion, with no indication that any particular grouping is better or useful.

Accordingly, what is needed is a system or apparatus allowing children and others to visualize the process of quantifying a set of objects, and once quantified, to manipulate that quantity with various mathematical techniques such as addition and subtraction. The apparatus should also be visually stimulating and exciting to help maintain attention of the users. The apparatus should be fool proof, and allow users to repeat any operation many times and always perform the same steps to get the result, in effect, be self-educating.

SUMMARY

The present invention solves the above problems using a plurality of block elements which are stacked together to produce a numeric quantity. The front and back of each block element can include dimples in the form of indentations allowing the block elements to stack together and remain cohesive as a unit.

Once stacked, the block elements are inserted into a block element container which will organize and hold a predetermined number of stacked block elements. The block element container has two identical portions which will close and lock only when the predetermined number of block elements are contained within. The block element container includes indentations which align and lock with the indentations and protrusions on the stack of block elements.

Further, at least one large container for block element containers can hold several block element containers for organizing and holding a predetermined number of stacked block element containers. The design of the container for block element containers is similar to the design of the block element containers.

In the preferred embodiment, a block element container will hold ten stacked block elements, and a large container will hold ten stacked block element containers. Therefore, this system represents the decimal (Base 10) counting system. Other counting systems such as Base 8 or 12 are possible, and only require different size containers.

The present invention also includes counting devices for providing a visual display of the number of block elements. Any of the block elements or containers can be inserted into the counting devices. In one embodiment, the counting devices has space for nine such elements (for example, block elements). When a tenth block is inserted, the counting device will produce a signal to the user that there are ten such elements. Therefore, the elements should be removed, stacked together inserted into a container, and moved up to the next magnitude unit. For example, if ten block elements are collected during an addition, the singles counting device will signal the user to remove the block elements, insert them into a block element container, and insert the block element container into the ten's counting device. This reinforces the concept of carrying "overflow" to the next magnitude counter. The counting devices can use several different means for determining the number of elements present. This can include an electronic sensing device, a weighing device, or a balancing device.

In another embodiment, there are a plurality of first block elements, each of the first block elements having a dimension of $1 \times R \times R^2$; a plurality of second larger block elements, having a dimension of $R \times R^2 \times R^3$; and at least one third larger block element, having a dimension of $R^2 \times R^3 \times R^4$; wherein R is the third root of a predetermined number.

The present invention can be implemented using physical block elements and containers. Alternatively, the block elements can be simulated on a computer display system using images of objects which are manipulated using a pointing device or keyboard.

DRAWING DESCRIPTION

DETAILED DESCRIPTION

Figure 1:
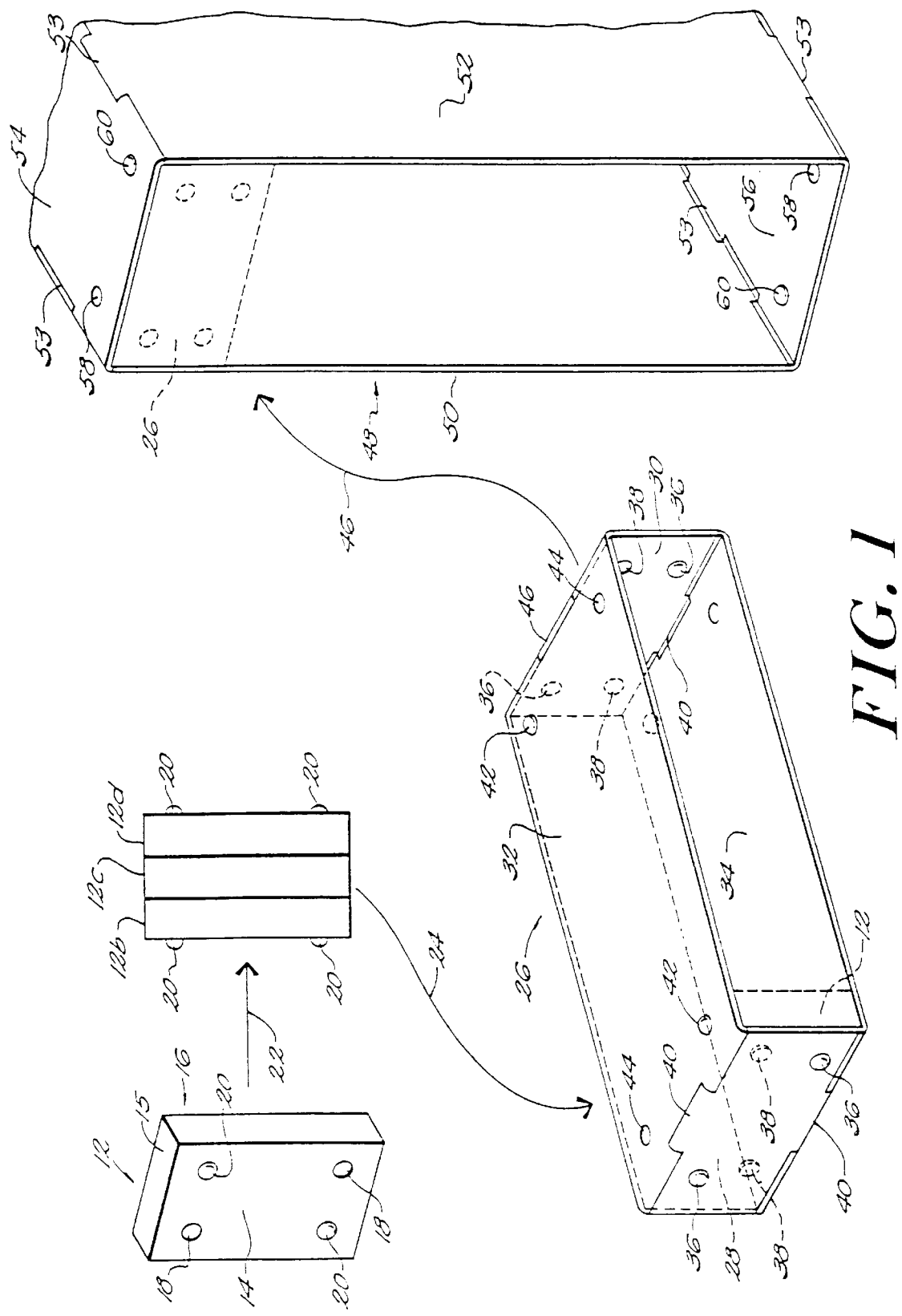
FIG. 1 is a pictorial view of block elements and block element sleeves according to the present invention.

The mathematical teaching apparatus 10, FIG. 1, of the present invention includes a block element 12 representing a single counting unit. Block element 12 is generally rectangular in shape with front 14 and back 16. Block element 12 can be constructed of any material. Block elements can also include dimples in the form of indentations 18 and protrusions 20 located on front surface 14 and back surface 16. These dimples and protrusions allow block elements 12 to be stacked together and maintain their position as shown by arrow 22. Block elements 12b, 12c and 12d are stacked and maintained together by dimples 18 aligning and connecting with protrusions 20.

Once a stack of block elements 12 are arranged, the block elements 12 are inserted into a block element container or sleeve 26, as generally shown by arrow 24. Block element sleeve 26 contains four sides, front 28, back 30, top 32 and bottom 34. These four sides are connected by hinges 40. Hinges 40 can be solid or flexible. Flexible hinges 40 allow the block element sleeve 26 to be collapsed for easy storage. Preferably, hinges 40 will be constructed to allow the block element sleeve 26 to normally maintain and unfolded (open) position, but require little force to collapse sleeve 26 for storage. When a predetermined number of stacked block elements 20 are inserted into block element sleeve 26, the indentations (dimples) 18 and protrusions 20 on block elements 12 will align and connect with dimples 36 and protrusions 38 on the front 28 and back 30 of block element sleeve 26. This will "lock" the stack of block elements 12 within block element sleeve 26, allowing easy manipulation as a unit. The proper number of block elements 12 must be inserted into block element sleeve 26. If fewer than the predetermined number are inserted, they will not lock into place.

Block element sleeve 26 also includes dimples 44 and protrusions 42 on the top surface 30 and bottom surface 34. These dimples and protrusions are on the outside of top and bottom surface 32 and 34.

Once several block element sleeves 26 are filled with block elements 12, block element sleeves 26 can be inserted into a container for block element containers (larger sleeve) 48, as generally shown by arrow 46. Larger sleeve 48 is similar to a block element sleeve 26 in that it has four sides, a front 54, a back 56, top 52 and bottom 50. These four sides are connected by hinges 53. Similar to the block element sleeve 26, the larger sleeve is collapsible along hinges 53 to allow easy stacking and storage of empty large sleeves 50.

Larger sleeve 50 include dimples 58 and protrusions 60 on the front surface 54 and rear surface 56. These dimples and protrusions align and connect with the protrusions 42 and dimple 44 on block element sleeve 26. This allows a stacked block element sleeves 26 to be inserted into larger sleeve 50 and "locked" into place allowing easy manipulation of a larger sleeve 48.

In the preferred embodiment, block element sleeve 26 will hold 10 block elements 12, and a larger sleeve 48 will hold 10 block element sleeves 26. This allows the teaching apparatus 10 to be used to demonstrate decimal notation based on tens and hundreds units. Alternate counting systems such as base 7, 8, 12 or 16 can also be used and are within the scope of the present invention. Indeed, a different set of block element sleeves 26 and larger sleeves 48 holding different numbers of block elements 12 can all be supplied as part of the mathematical teaching apparatus 10.

When used as a decimal (base 10) counting system, the block elements 12 represent single units or ones; block element sleeve 26 represents tens units; and larger sleeve 48 represent hundreds unit. An even larger sleeve (not shown) can be employed for grouping block elements into thousands, etc.

The proportions of block elements 12, block element sleeves 26 and larger sleeves 48 are all proportioned to each other using the dimension ratio of $1 \times R \times R^2$, where R is the third root of 10; which approximately is $1 \times 2.15 \times 4.64$. The dimension ratio for a ten block unit (block element sleeve 26) is $R \times R^2 \times R^3$ (approximately $2.15 \times 4.64 \times 10$). The dimension ratio for a 100 block unit (larger sleeve 48) is $R^2 \times R^3 \times R^4$, which is approximately $4.64 \times 10 \times 21.5$. Should a thousand block unit (not shown) be desired, the dimension ratio would be $R^3 \times R^4 \times R^5$, etc.

This proportional ratio results in the feature that all the block elements and containers maintain the same shape for each unit for order of magnitude. For example, a tens unit resembles the ones unit, only larger in size. Further, exactly ten ones units will fit inside a tens unit, with no left over space. The concept that ten ones can be packed into one tens unit provides users with a clear understanding how counting units are grouped and "packed" together. Correspondingly, ten tens units will fit inside a hundreds unit, which again has the same shape as the tens and ones units.

As long as the ratio proportion is maintained, the block elements 12 and sleeves 26, 48 can be manufactured in any size. For use by young children, a block element size of 1×2.15×4.65 centimeters (length×width×height) allows easy manipulation by young hands. The sleeves 26, 48 are proportionally sized.

If a different base unit is used, then R would be the third root of the base system. For example, if a base twelve counting system is used, then R would be the third root of twelve, approximately 2.29.

Figure 3:
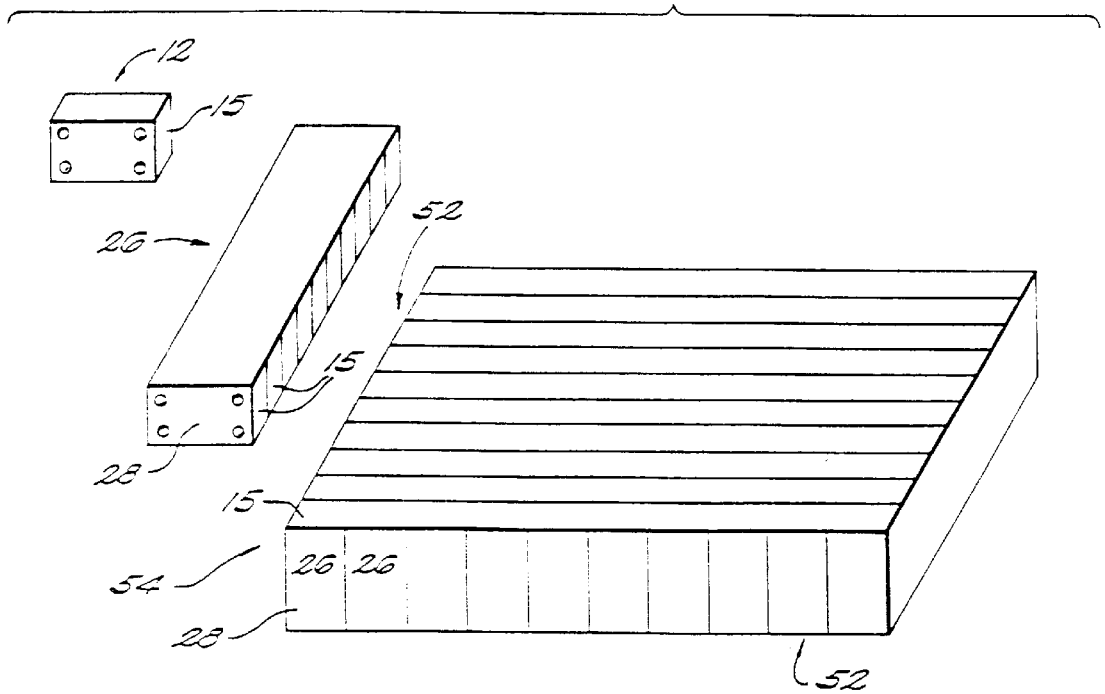
FIG. 3 is a pictorial view of how stacked block elements and block element sleeves provide a visual cues for organization and counting.

This dimension ratio allows for the block elements 12 and sleeves 26, 48 to each stack together neatly inside the next larger size. As seen in FIG. 3, ten block elements 12 will stack inside a block element sleeve 26, with their top side 15 exposed. A user can see the stack of ten block elements 12 stored inside the sleeve 26. When block element sleeves 28 are stored in a larger sleeve 48, the same effect occurs. The end side 28 of block element sleeves 26 are visible, so the user can see that ten block element sleeves 26. However, in one embodiment, the sides 50, 52 of large sleeve 48 are produced of a transparent material, which allows the user to see the top sides 15 of block elements 12. The user can visually understand the organization that ten sleeves 26 holding ten block elements 12 totals one hundred block elements 12. Also, different sleeves can be produced. For example, sleeves with opaque sides can be used to hide the blocks inside, thereby preventing a novice user from seeing the multiple block elements inside. A more advanced user could use the sleeves with transparent sides, and appreciate the added information of the array of visible block elements inside.

Figure 2:
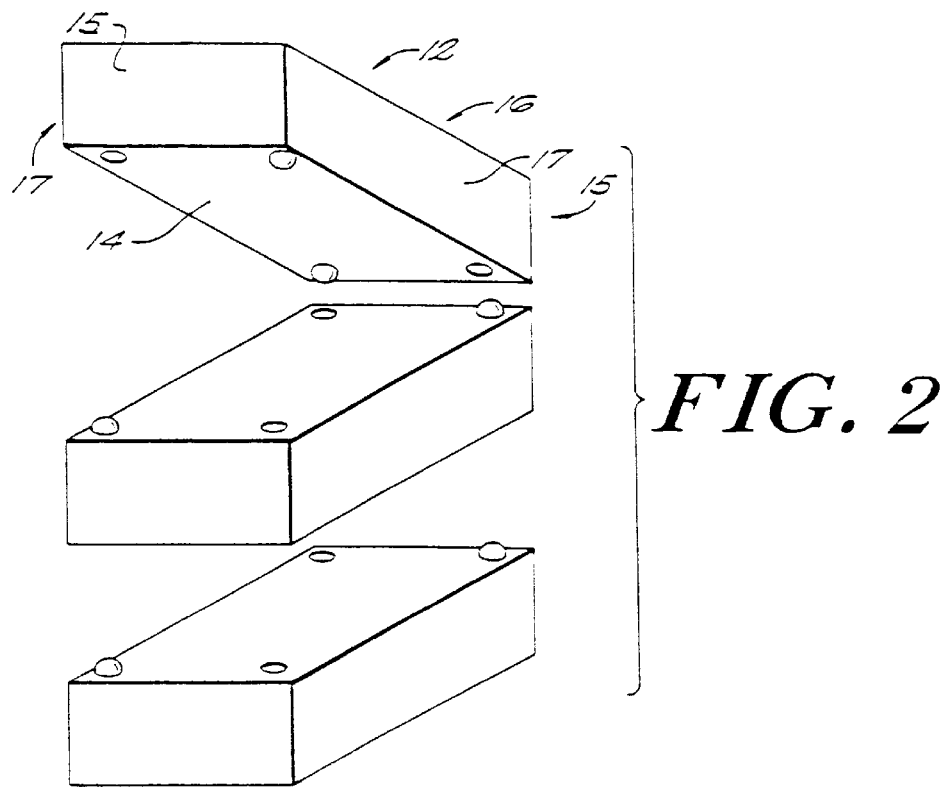
FIG. 2 is a pictorial view providing details of a block element, showing a physical appearance scheme according to the present invention.

Block elements 12, FIG. 2 include coloration of various sides to assist a person in visualizing and counting a set of stacked block elements. For example, all block element 12 can include a standard color on top and bottom sides 15 and a different standard color on left and right side 17. Therefore, when block elements 12 are stacked together, a common color is presented on front and back 15, and a different standard color represented on left and right side 17.

Accordingly, when a stack of ten block elements 12 are inserted into a block element sleeve 26, the color on the top and bottom 15 of block elements 12 will appear as a contiguous side of block element sleeve 26. This informs a user that ten block elements 12 have been inserted into block element sleeve 26. Thus the concept that a unit formed of block element sleeve 26 comprises ten sub-units, which are block elements 12 is reinforced.

The color scheme is continued by forming block element sleeve 26 with uniform color on front 28 and back 30 sides. Therefore, when block element sleeves 26 are inserted into larger sleeve 48, the uniform color on front 28 and back 30 surfaces of block element sleeve 26 are apparent to the user who can view the inserted block element sleeve 26 and larger sleeve 48. Continuing in this theme, top 54 and bottom 56 of larger sleeve 48 are of uniform color to indicate the hundreds unit.

In a preferred embodiment, block elements 12 are grey on front 14 and back 16, red on top and bottom 15, and blue on the left and right side. Block element sleeves 26 are green on end sides 28, 30 and grey on top and bottom sides 32 and 34. Larger sleeves 48 are yellow on front and back sides 54, 56, and grey on top and bottom sides 52 and 50. This color scheme therefore makes red represent single units (ones), green represent tens units, and yellow represent hundreds units. Each unit color displays correctly due to the ratio formula previously discussed. Other color schemes can be chosen for the various units.

Figure 5:
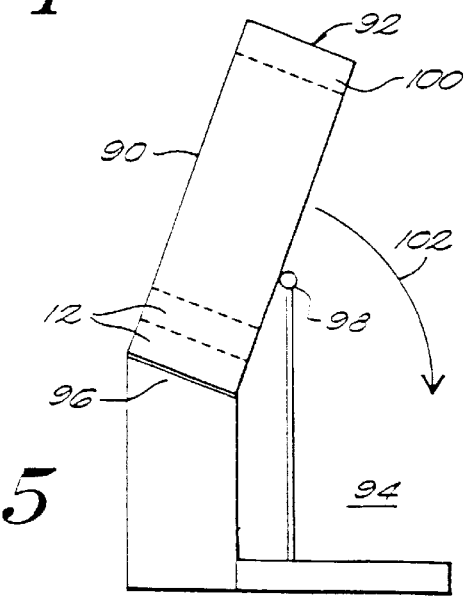
FIG. 5 is a pictorial view of another embodiment of a block element loading and counting device according to the present invention.

In another embodiment similar to the previous description, ten block elements 12 are placed inside a five sided container, with an open top (for example, see block element storage container 90, FIG. 5). A cover is then placed over the top, which now forms the container into a new "block element" for a tens unit. This sealing of ten block elements inside a container helps the user to understand that the single units must be collected and grouped in order to be counted.

In a variation on this embodiment of the present invention, the cover can not be placed on the container unless ten block elements 12 are placed inside the container. A mechanical lever device prevents the cover from installing on the container if less than ten block elements are inside. Once ten block elements are inserted into the container, then the top cover can be installed and will lock into place. This mechanical lever device can be built into the sides of the container, requiring a tenth block element (located near the top of the container) to displace the lever; or the mechanical lever device could be built into the top cover.

Figure 4:
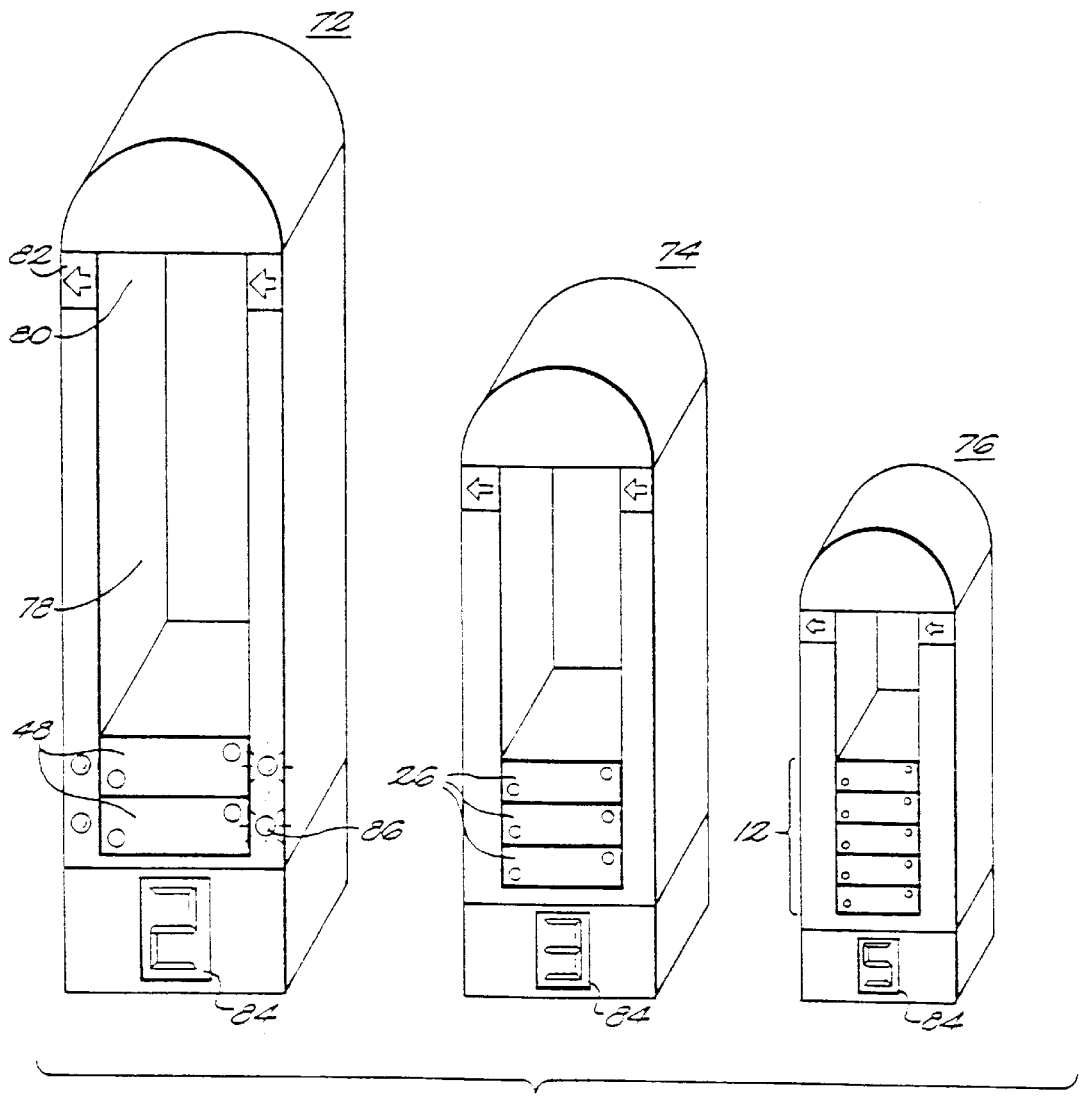
FIG. 4 is a pictorial view of one embodiment of loading and counting devices for counting block elements and block element sleeves.

Block elements 12, block element sleeves 26 and larger sleeves 48 can be automatically counted using a loading and counting device. For larger sleeves 48, a loading and counting device 72 FIG. 4 can show the number of larger sleeves 48 indicating a numerical quantity in the hundreds field. In one embodiment, larger sleeves 48 are inserted inside slot 78 of counting device 72. A visual display 84 indicates the number of inserted sleeves 48, which in this example is two. Other visual indicia such as lighting LED's 86 which indicate an inserted larger sleeve 48 can also be used.

Larger sleeve loading and counting device 72 contains enough internal space in slot 78 to allow the insertion of 9 larger sleeves 48. A special slot 80 is available for when a tenth sleeve 48 is inserted. Upon insertion of a sleeve 48 into area 80, lighting indicia 82 are activated, indicating to the user that all ten units should be removed from counting device 72 and moved into the next larger size device. This teaches the concept that a set of ten units needs to be moved into the next counting unit of magnitude. Different means of indicating that a tenth unit should be removed include a lighting indicia as shown by 82, or an ejection system which would eject all ten sleeves 48 (not shown).

Counting units are provided for each block units, including a loading and counting device 74 for block element sleeves 26, and a singular block element loading and counting device 76 for block elements 12. The counting devices 72, 74 and 76 can be separate units, or connected together into one device (not shown). The numeric display 84 can be determined by any sensing means inside counting devices 72, 74, 76, which includes a pressure sensitive switch for each element slot, electrical contact points, or a weighing device. Further, counting devices 72, 74, 76 can include a numerical input device, such as a keypad, allowing the user to enter a count for the number of elements inside the counting devices 72, 74, 76 whereupon the counting device will signal if the number entered was correct or not.

In an alternative embodiment, a block element storage device 90 FIG. 5 is used in conjunction with a count limiting device 94 to teach the concept of carrying over to the next magnitude unit size. Block element storage device 90 comprises a rectangular box-like device with five sides and an open top 92. As block elements 12 are inserted into storage device 90, block elements 12 will stack.

When storage device 90 is inserted on podium 96 of count limiting device 94, storage device 90 will lean against pivot point 98. As more block elements 12 are inserted into storage device 90, the center of gravity will rise. When a tenth block element 12 is inserted in the top of storage device 90 through opening 92 as generally shown by 100, the center of gravity of storage device 90 will cause element storage device 90 to pivot over pivot point 98 as generally shown by arrow 102. In effect, the element storage device tips over. The provides an indication to the user that the block elements 12 should be collected as a stack of ten, either by putting a cover on the block element storage device 90, as previously discussed, or by placing the block elements 12 within a block element sleeve 26. Count limiting device 94 can also be produced for counting block element sleeves 26 and larger sleeves 48.

In using the mathematical teaching apparatus, a child or other user can easily visualize the concepts of addition and subtraction. For example, given an arbitrary number of block elements, a user can then be instructed to group the elements into a numeric quantity. The user inserts block elements 12 into block elements sleeves 26 in groups of ten, thereby producing a set of filled block element sleeves 26 and a remaining number of block elements. The user can then report the number of block elements by using the number of block element sleeves 26 for the 10's column and the remaining number of block elements 12 for the singles column. In performing these steps, the user is learning the decimal counting process through learning by doing.

For addition, a user is given an arbitrary number of filled block element sleeves 26 and block elements 12, and then be given another number of the same. The user will learn that the block elements 12 must first be combined (stacked) to see if the number of block elements exceeds ten. If so, then the user must insert ten block elements 12 into a block element sleeve 26. Subsequently, the user might determine that the number of block element sleeves 26 is greater than 10 and requires the insertion of block element 26 into a larger sleeve 48.

In performing these steps, the user can approach the addition problem from either end -ie, by combining the larger units first ("left to right"), or the smaller units first ("right to left"). Although children are often taught to add the smaller units first (as taught by using numbers arranged columns), this is not the only solution. The present invention allows users to combine block elements and sleeves in any order. Therefore the user can discover different orders for combining block elements and sleeves, and decide if combining the smaller units first is "better".

In subtraction, the concept of carrying is readily learned in that if a user lacks the proper number of units (such as block elements 12) to subtract, they must "borrow". The user would take apart a larger unit, such as by removing ten block elements 12 from a block element sleeve 26 to obtain enough block elements 12 to perform the subtraction operation for the singles unit. Hence, the present invention reinforces the concept of borrowing from a larger unit to perform the subtraction operation.

Although the present invention has been described in terms of presenting the user with a system for visualizing the standard mathematical concepts for addition and subtraction, the present invention actually presents a much broader concept. By using the present invention, users learn two techniques:

1. How to put together and take apart collections of objects.
2. How to load the collections of objects into loading and counting devices.

In mastering these two techniques, the user has learned the fundamental concept underlying arithmetic. Objects are grouped into collections, and then the objects and collections are partitioned into a quantity measurement. By performing the two techniques, the user will discover how any quantity can be represented using the decimal counting system. Since collections must contain ten subobjects in order to form a complete unit, and loading and counting devices will signal when objects or collections are full, other solution is possible. The system is fool proof. The objects and collections can not be packed up incorrectly. The units will pack up reliably and manageably. The user learns the proper grouping, and numerical quantifying, of a set of objects, without supervision. Once this fundamental concept is understood, then addition and subtraction are simply variations of this concept.

Multiplication and division problems are also easily presented and solved using the present invention. For an example of long division, suppose a user was asked to divide 500 by 4. The user would take 5 hundred-block containers, and learn (or be instructed) to distribute those 5 hundred block containers into four equal amounts. The user would put one hundred-block container in each of four piles. The last hundred-block container will not divide out equally -unless it is opened and its contents distributed out equally. The user therefore would take the ten ten-block containers from inside the last hundred-block container, and put two ten-block containers into each of the four piles. The two remaining ten-block containers must then also be opened, and the result is five individual blocks are added to each of the four piles. The result is that each of the four piles contains one hundred-block container, two ten-block containers, and five single blocks, for a total of 125. Notice how the steps performed closely match the standard method of teaching long division.

An example of multiplication includes having several users such as children working together in groups. To multiply 7 by 135, have seven children each collect 135 blocks, and then combine the results. After the children have consolidated all the blocks into appropriate containers, they will have nine hundred-block containers, four ten-block containers, and five single blocks, for and answer of 945. The correct answer may be less important than the process which the children must perform to get the correct answer.

Another concept related to multiplication is the orders of magnitude, including multiplying or dividing any quantity by ten. The self-replicating shape allows users to quickly grasp the concept that simply shifting all blocks and containers for the next size up results in a multiplication by ten. Shifting down results in division by ten.

Decimal numbers are also easily represented. In accordance with order of magnitude, as previously mentioned, the self-replicating shape and different units help demonstrate that working with decimals can be easily performed by shifting block and container sizes. Using the present invention, a decimal point is simply an indication of which block is the "ones" unit. Users can shift the decimal point over (intuitively), perform an operation, and shift the decimal point back to get the right answer.

Figure 6:
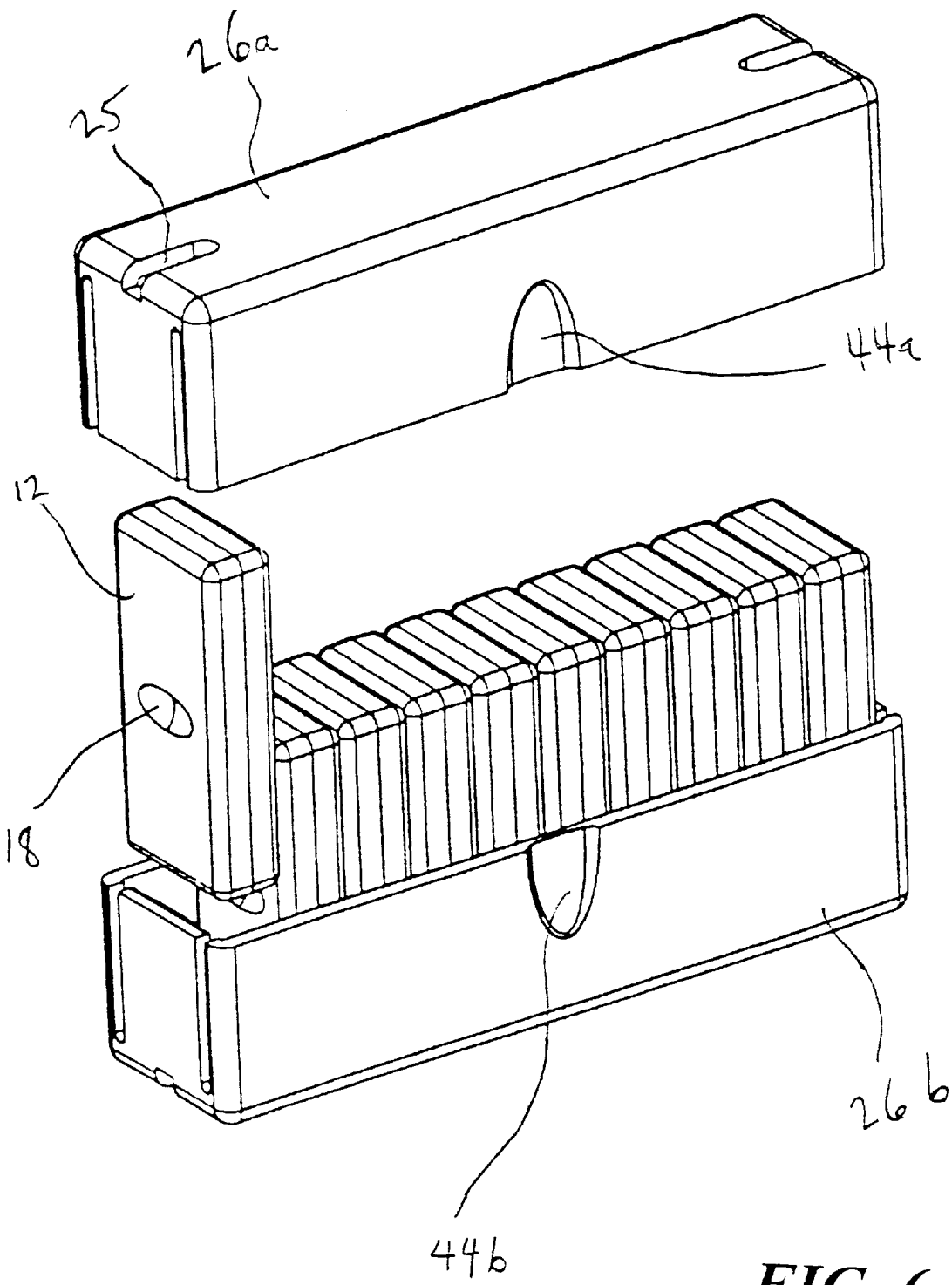
FIG. 6 is a side view of a preferred embodiment of block elements and block element container.

Another embodiment of the present invention includes block elements 12 FIG. 6 with a center indentation 18 located on each side. Block elements 12 fit inside block element container 26. In this embodiment, block element container 26 is divided into two separate symmetrical parts or halves 26a and 26b. Block element container 26 includes a center indentation 44a and 44b, on each side. Block element container 26 also includes opening 25, which will be discussed below.

Figure 7:
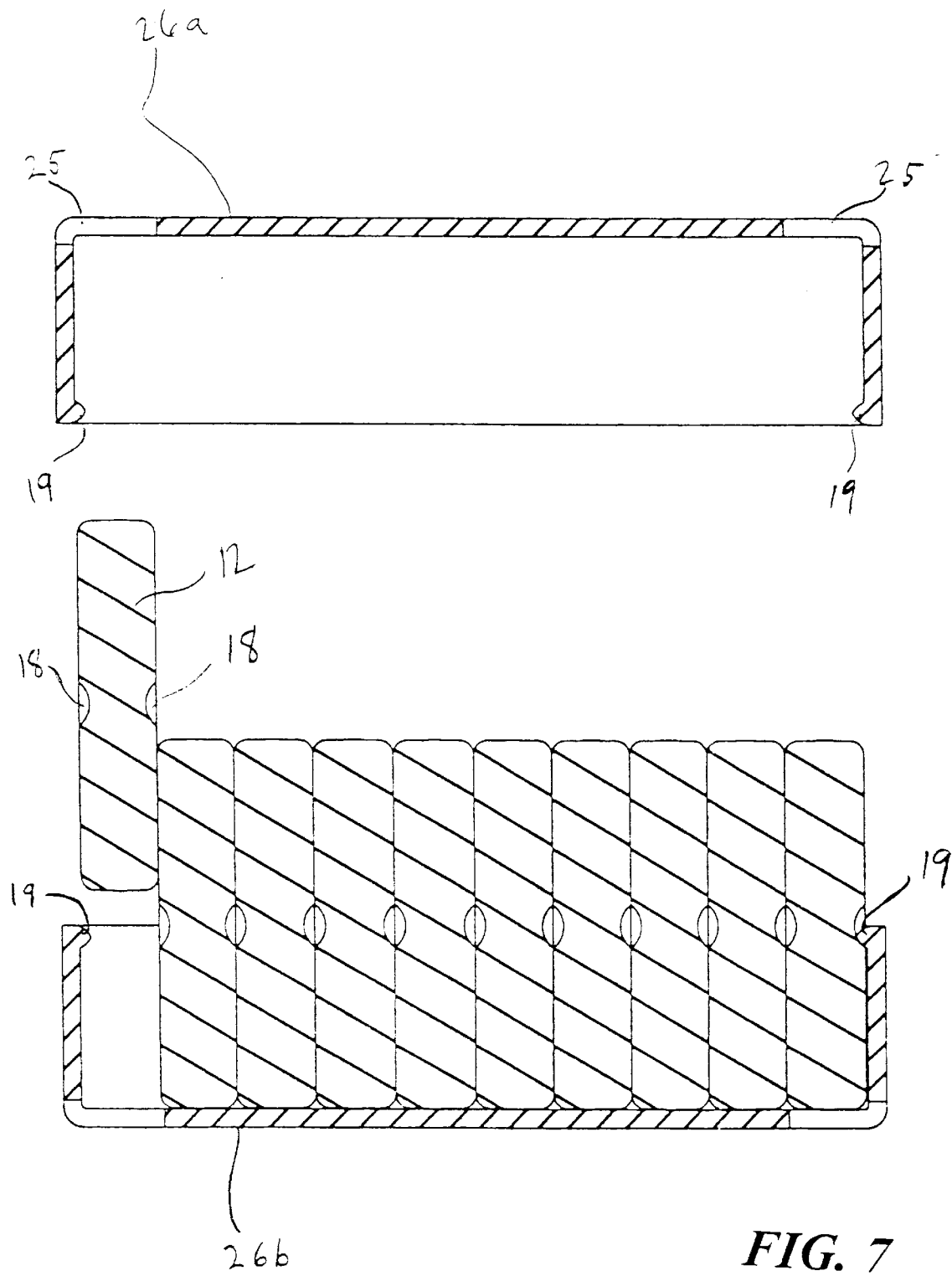
FIG. 7 is a sectional view of the block elements and block element container of FIG. 6.
Figure 8:
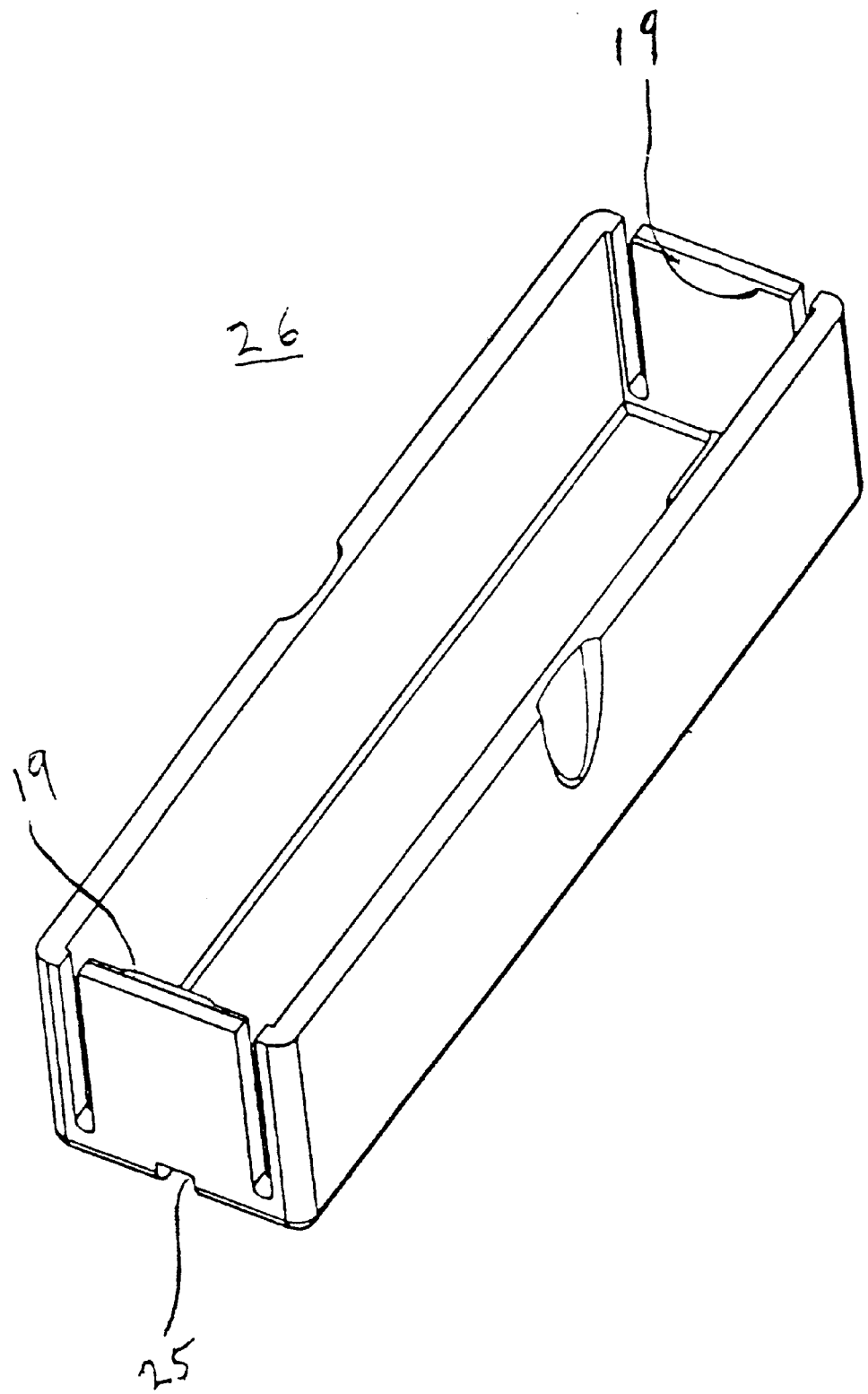
FIG. 8 is perspective view of one part of a block element container of FIG. 6.
Figure 9A:
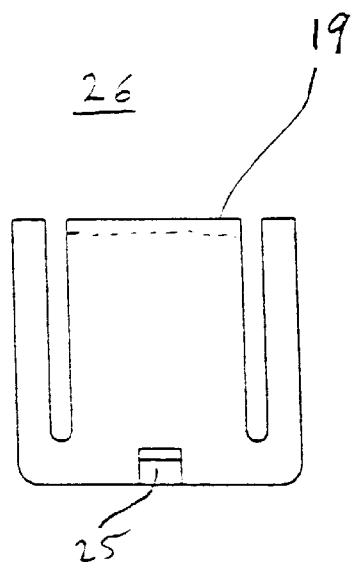
FIG. 9A is an end view of one part of a block element container of FIG. 8.
Figure 9B:
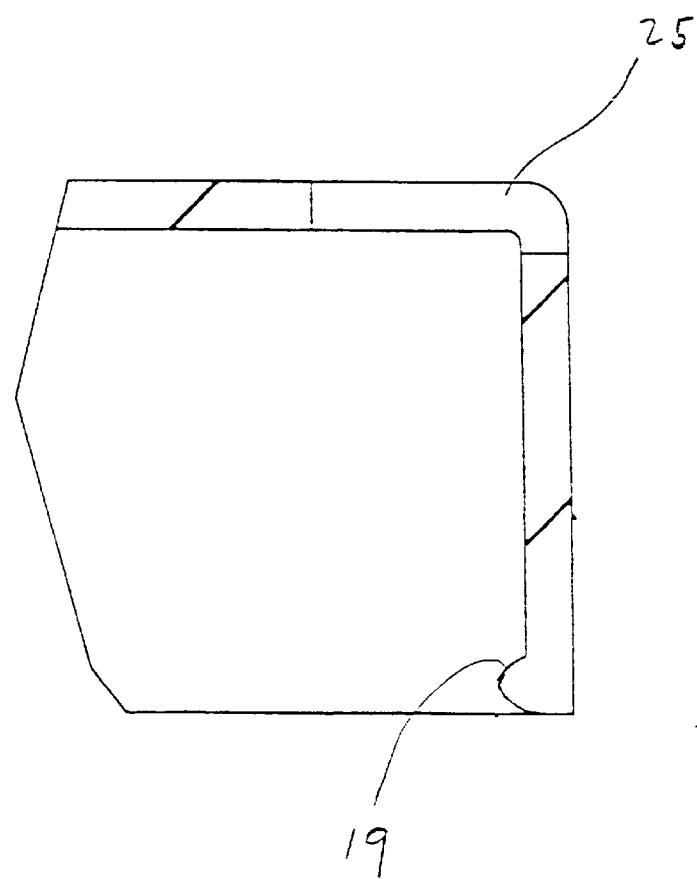
FIG. 9B is a sectional view detail of an end of a block element container of FIG. 8.

As shown in FIG. 7, block elements 12 slide into one half of block element container 26b. Block element container halves 26a and 26b also include an engaging member 19 at each end. These engaging members 19 engage in indentation 18 of block elements 12, thereby locking block elements 18 into block element container 26, when the proper predetermined number of block elements 12 are inserted. The two halves of block element container 26 will then close and lock, thereby forming a complete unit. FIG. 8, 9A and 9B include detailed views of engaging members 19.

This is a key feature of the present invention. When used for counting purposes, a user will quickly understand that in order to make a higher counting unit (for example a block element container 26), the user must collect and insert the proper number of lower counting units (block elements 12) into the higher counting unit. Unless the proper number of lower counting units are inserted, the upper counting unit will not be formed. In an example of a decimal counting system, with block element container 26 designed to hold ten block elements 12, the block element container halves 26a and 26b will not close and lock together unless ten block elements 12 have been inserted.

Another feature is that when closed, block element container 26 resembles a block element 12, only larger in size. The center indentations 18 and 44 are present on both elements, and the ratio of the dimensions is maintained.

For counting in higher units, a container for block element containers 48 (not shown) is provided. The container for block element containers 48 is constructed exactly as the block element container 26 is constructed, only larger, and based on the ratio measurements as previously discussed. A predetermined number of block element containers 26 (which in turn, must each contain a predetermined number of block elements 12), must be inserted into the two halves which form container for block element container 48, to allow it to engage and lock.

Figure 10:
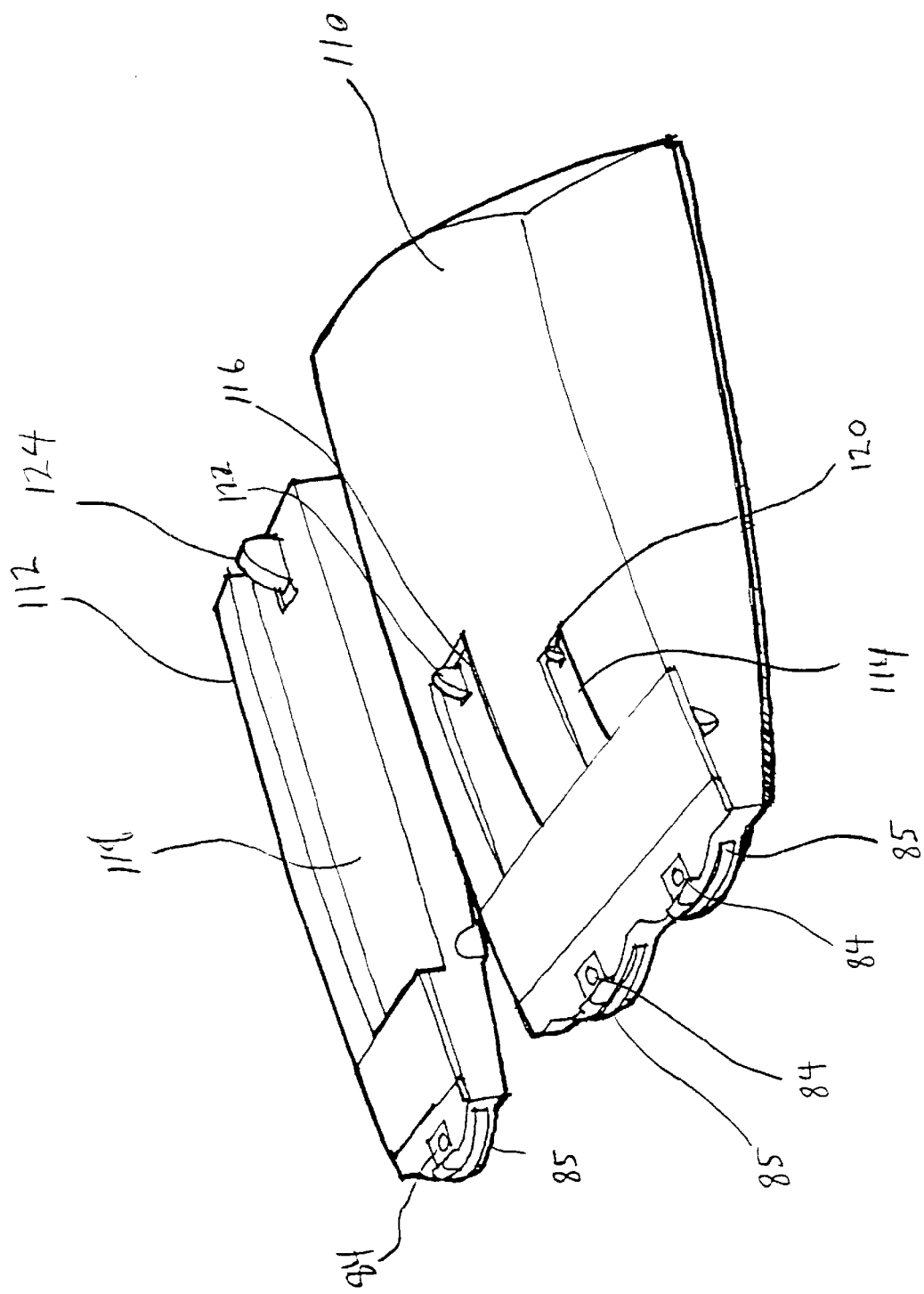
FIG. 10 is a perspective view of a block element counting device according to a preferred embodiment.

The alternative embodiment also includes counting and organizing device 110 FIG. 10. Counting and organizing device 110 includes a slot 114, which allows placement of one half 26a of a block element container. Extension tab 120 will engage in opening 25 (as shown in FIG. 6 and 8) of block element container half 26a, to keep it from sliding down the inclined surface of counting and organizing device 110.

Extension tab 120 is elastically mounted, so that it can be pushed down with minimal force. A spring or other tension device is employed to allow extension tab 120 to be normally maintained in an upright position. Alternatively, extension tab 120 in connected to a mechanism which physically ejects block element container half 26a when extension tab 120 is pushed down (not shown).

In operation, counting and organizing device 120 further enforces the concept of grouping elements into units based on counting system. When a user places a block element container half 26a on slot 114 and starts placing block elements 12 inside block element container half 26a, the user can only place one less then the predetermined number of block elements 12 in block element container half 26a. For example, in using ten block elements to fill one block element container 26, a user would be able to put up to nine block elements within block element container half 26a. Since counting and organizing device 120 has an inclined surface, the block elements 12 will collect at the lower end of block element container half 26a. However, when the user pushes a tenth block element 12 into block element container half 26a, that block element pushes down on extension tab 120. This releases block element container half 26a, which then slides off of counting and organizing device 120. Therefore extension tab 120 functions as a count limiting device. The user will not be able to put block element container half 26a back onto slot 114 and have it remain there. Further, since the ten block elements 12 are locked into block element container half 26a, block element container half 26a has formed a solid unit, with no loose block elements 12 inside.

This provides a clear indication something different must now be done with block element container half 26a, which is filled with ten block elements 12. A reasonable solution would be to enclose block element container half 26a with a second half 26b, to form a complete block element container 26. The user can then place the block element container 26 in one half of a container for block element containers 48, which can be placed on slot 116 of counting and organizing device 110. Slot 116 also includes an extension tab 122, which engages in an opening on the one half of container for block element containers 48, and prevents it from sliding out of slot 116. However, if ten containers for block element containers are inserted into the one half of container for block element container 48, it will slide out of slot 116.

Counting and organizing device 120 would be able to group and count 99 block elements. An extension counting and organizing device 112 is used if 100 or more block elements are to be organized. The extension counting and organizing device 112 can group and count up to 999 block elements.

As previously described, this novel invention is very useful for teaching the concepts of collecting and grouping, which is a fundamental concept of addition and subtraction. For example, a user attempting to add together two quantities of block elements 12 will have little choice but to pack block elements 12 into block element containers 26, with the number of block elements 12 going into each block element container 26 limited by counting and organizing device 120. As each half 26a of a block element container gets filled, it will no longer remain in slot 114. The user must then complete the block element 26, and move it over. Subtraction works in a similar way, with the possible necessity of a user needing to "break open" a block element container 26 to provide enough block elements to complete the subtraction (carry over).

Figure 11:
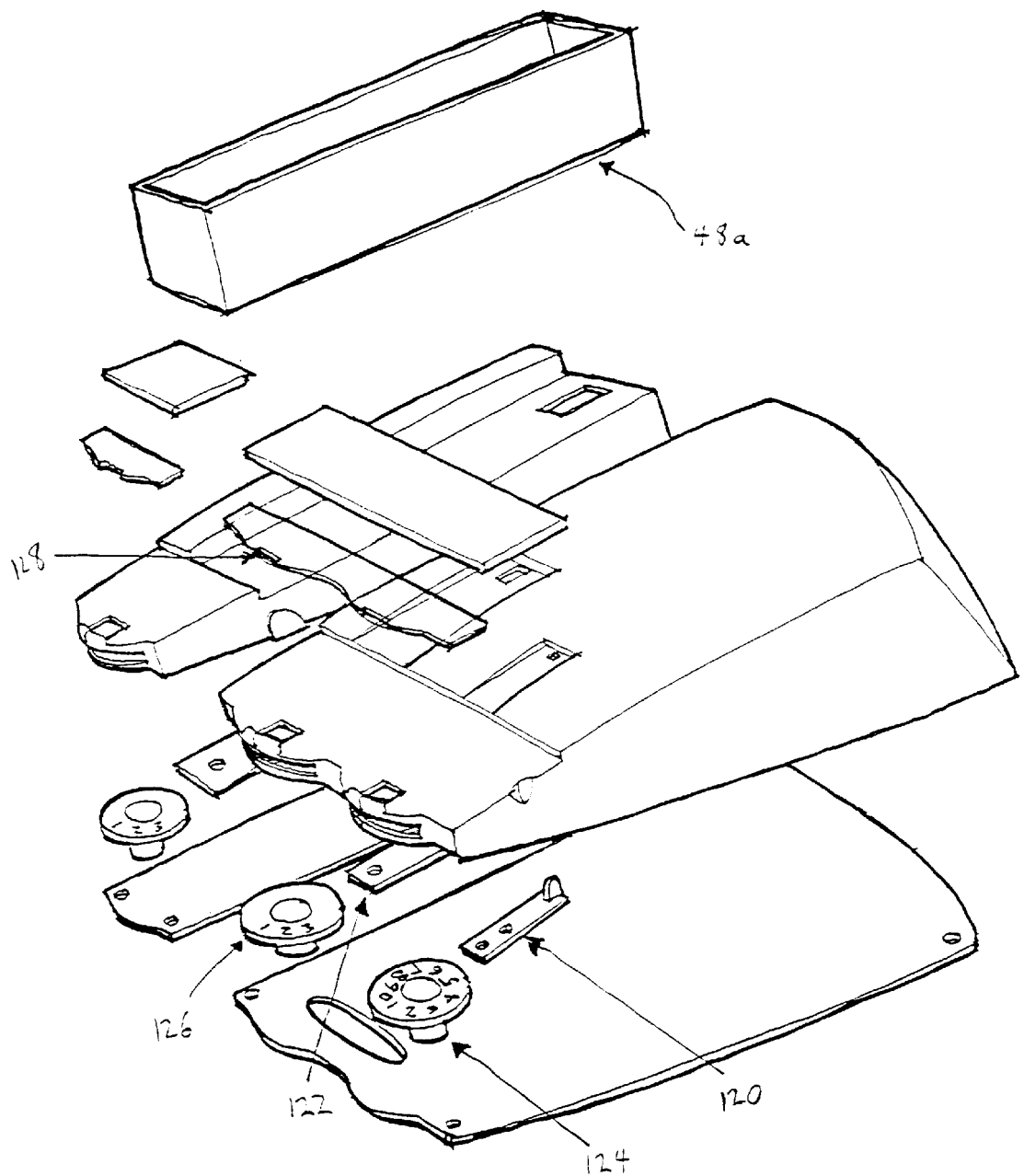
FIG. 11 is an exploded view of the block element counting device of FIG. 10.

Some parts of Counting and organizing device 120 is shown in more detail in FIG. 11. Counting and organizing device 120 is preferably constructed from hard plastic such as urethane, and includes thumb wheels 124, 126, to allow a user to record the number of elements 12, 26 presently on counting and organizing device 120. A transparent front plate 128 is placed on the front panel.

Preferably block elements 12, block element containers 26 and containers for block element containers 48 are constructed from cast urethane. The elements may be colored according to a color scheme as previously discussed, or may all be one color. Certain elements may be translucent.

Accordingly, the present invention allows a child or other person to easily visualize and grasp the concepts of numerical representation of units, and the higher concepts of addition, subtraction and other operations using such numerical quantities for units. Although implemented using block elements and sleeves, the present invention can also be implemented using a visual display device. One example of a display device is a computer monitor. A computer system is programmed to implement element images on a computer screen with a graphic user interface, and allow manipulation using a visual pointing device, such as a mouse. The user would perform the same operations of moving block elements into a block element sleeve by selecting and moving or dragging units on the screen. The computer system would provide visual indications of the number of elements counted. Lessons consisting of steps to be performed provided by a child or other person can also be implemented on such a computer system.

If a computer system is used, variations on the ratio are possible, and are included within the scope of the invention. Since computer displays work well with two-dimensional images, a size ratio for two dimensional block elements 12 may be used. A ratio of 1×S, where S is the square root of ten, works (actually, this works for any base, where S is the square root of the base). When ten block elements 12 are stacked, the ratio becomes 10×S, or S×10, or S×S$^2$, which is proportional to 1×S.

Figure 12:
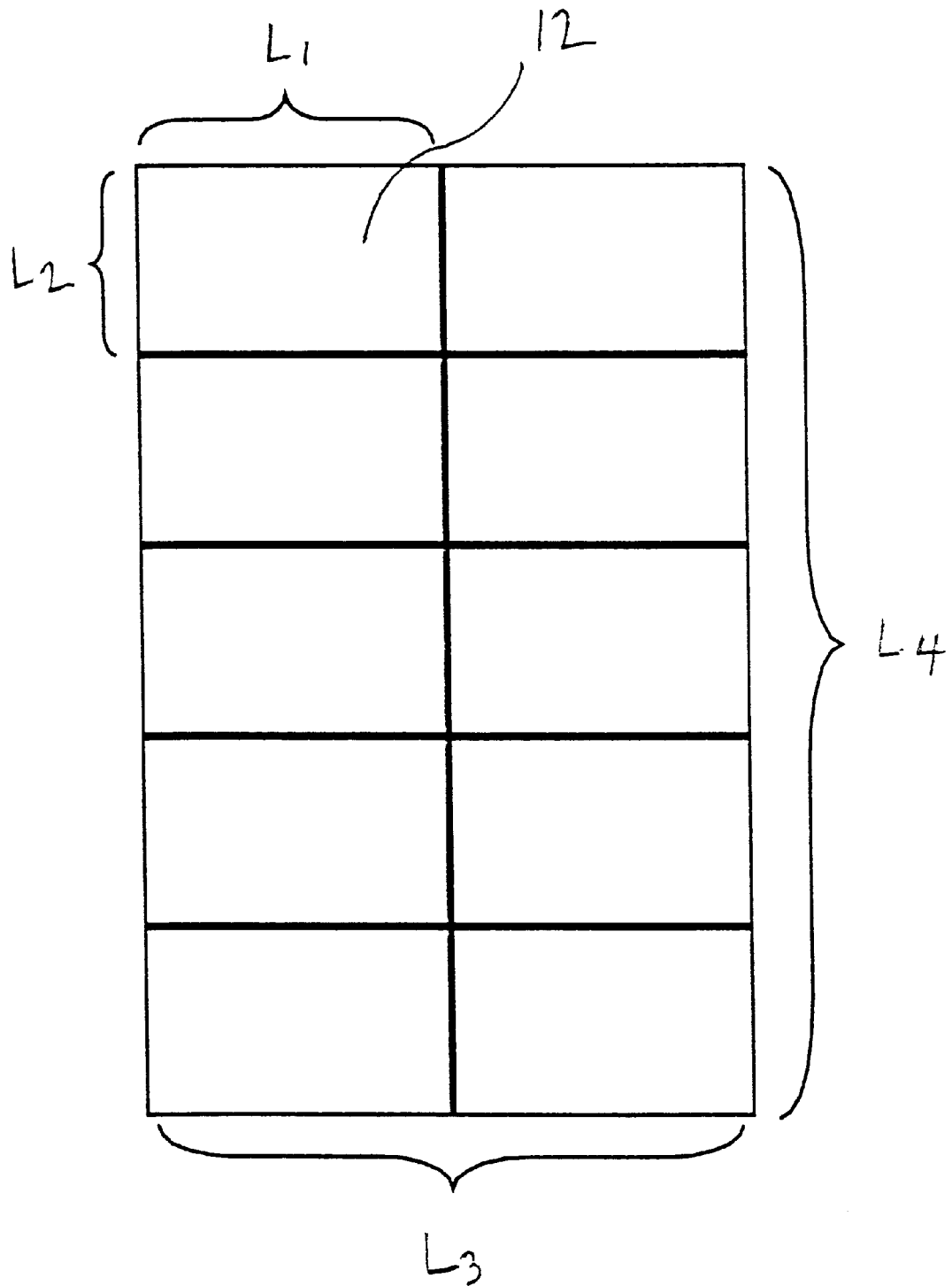
FIG. 12 is a illustrative view of a two-dimensional block element ratio according to the present invention.

For the special case of base 10, the block elements 12 can also be grouped or stacked as a 5×2 array, as shown in FIG. 12. For this arrangement, the formula is 1×S/2, where S is the square root of 10. As seen in FIG. 12, block element 12 has a width to length ratio ($L_2$ to $L_1$) of $1 \times 1.58$ ($1 \times S/2$). When stacked in a 5×2 array, the ratio becomes $5 \times S$ ($L_4$ to $L_3$), or $S \times 5$, which is $S \times S^2/2$, and is proportional to $1 \times S/2$.

In fact, there are also two solutions for base 10 stacked as 5×2 arrays for three dimensions. The first is $1 \times R \times R^2/2$, which is approximately $1 \times 2.15 \times 2.32$. When stacked it becomes $5 \times R \times R^2$, and after rotation $R \times R^2 \times 5$, or $R \times R^2 \times R^3/2$, which is proportional to $1 \times R \times R^2/2$.

The second solution is $1 \times R/2 \times R^2/2$, which is approximately $1 \times 1.08 \times 2.32$. When stacked, it becomes $5 \times R \times R^2/2$, and after rotation $R \times R^2/2 \times 5$, or $R \times R^2/2 \times R^3/2$, which is proportional to $1 \times R/2 \times R^2/2$.

Modifications of the present invention are possible in light of the above disclosure. It is therefore to be understood that the scope of the invention is limited only by the following claims.

What is claimed is:

1. A mathematical teaching apparatus comprising:
   a plurality of block elements; and
   at least one block element container for holding a predetermined number of block elements, said at least one block element container comprising two identical parts, said two identical parts engaging and forming a complete unit only when said predetermined number of block elements are contained within.

2. The mathematical teaching apparatus of claim 1 wherein:
   each of said plurality of block elements includes a front and back side, and an indentation on said front and back side; and
   said two identical parts of said block element container include protrusions for engaging said indentation on said front of one block element, and for engaging said indentation on said back of another block element, when said predetermined number of block elements are contained within said two identical parts of said block element container.

3. The mathematical teaching apparatus of claim 1 wherein:
   said predetermined number of block elements will substantially fill said at least one block element container.

4. The mathematical teaching apparatus of claim 1 wherein said block element container has a same length, width and height ratio, and a similar appearance to said block element.

5. The mathematical teaching apparatus of claim 4 wherein each of said plurality of block elements has dimensions of $1 \times R \times R^2$, where R is the third root of said predetermined number of block elements contained in said at least one block element container.

6. The mathematical teaching apparatus of claim 5 wherein said at least one block element container has dimensions of $R \times R^2 \times R^3$, where R is the third root of said predetermined number of block elements contained in said at least one block element container.

7. The mathematical teaching apparatus of claim 6 wherein:
   when said two identical parts of said block element container are engaged to form a complete unit, said block element container includes a front and back side, and an indentation on said front and back side.

8. The mathematical teaching apparatus of claim 7 further including:
   at least one container for block element containers, for holding a predetermined number of block element containers, said at least one container for block element containers comprising two identical parts, said two identical parts engaging and forming a complete unit only when said predetermined number of block element containers are contained within.

9. The mathematical teaching apparatus of claim 8 wherein:
   said two identical parts of said container for block element containers include protrusions for engaging said indentation on said front of one block element container, and for engaging said indentation on said back of another block element container, when said predetermined number of block elements containers are contained within said two identical parts of said container for block element containers.

10. The mathematical teaching apparatus of claim 8 wherein said container for block element containers has a same length, width and height ratio, and a similar appearance to said block elements and said block element container.

11. The mathematical teaching apparatus of claim 10 wherein said at least one container for block element containers has dimensions of $R^2 \times R^3 \times R^4$, where R is the third root of said predetermined number of block element containers contained in said at least one container for block element containers.

12. The mathematical teaching apparatus of claim 4 wherein said predetermined number of block elements contained in said at least one block element container is ten.

13. The mathematical teaching apparatus of claim 12 wherein each of said plurality of block elements has dimensions of $1 \times R \times R^2/2$, and said at least one block element container has dimensions of $R \times R^2 \times R^3/2$, where R is the third root of 10.

14. The mathematical teaching apparatus of claim 12 wherein each of said plurality of block elements has dimensions of $1 \times R/2 \times R^2/2$, and said at least one block element container has dimensions of $R \times R^2/2 \times R^3/2$, where R is the third root of 10.

15. The mathematical teaching apparatus of claim 1 wherein said predetermined number of block elements contained in said at least one block element container is ten.

16. The mathematical teaching apparatus of claim 1 further including:
   a grouping and counting device, for grouping and counting block elements and block element containers, said grouping and counting device including a count limiting device, to indicate when said predetermined number of block elements are contained within said block element container.

17. The mathematical teaching apparatus of claim 16 further wherein:
   each part of said at least one block element container includes an opening; and
   said grouping and counting device includes an inclined surface and a slot for holding one part of said block element container, said slot including an extension tab for engaging said opening in said one part of said block element container, said extension tab for maintaining said one part of said block element container in said slot.

18. The mathematical teaching apparatus of claim 17, wherein inserting said predetermined number of block elements into said one piece of said block element container on said slot of said grouping and counting device will push down said extension tab.

19. The mathematical teaching apparatus of claim 1, wherein said plurality of block elements and said at least one block element container for holding a predetermined number of block elements are implemented by a program running on a computer, and displayed and manipulated by a user on a computer display with a graphic user interface.

20. A mathematical teaching apparatus comprising:
- a plurality of elements representing single counting unit elements;
- at least one ten counting unit element, said ten counting element replicating the same shape as said plurality of single counting unit elements, wherein ten of said single counting unit elements will fit inside said ten counting unit elements, and said ten counting unit element provides an indication when exactly ten of said single counting unit elements are contained within.

21. The mathematical teaching apparatus of claim 20 further including:
- at least one hundred counting unit element, said hundred counting unit element replicating the same shape as said plurality of single counting unit elements and said ten counting unit element, wherein ten of said ten counting unit elements will fit inside one of said hundred counting unit elements, and said hundred counting unit element provides an indication when exactly ten of said ten counting unit elements are contained within.

22. The mathematical teaching apparatus of claim 21 wherein said counting units elements, ten counting unit elements, and hundred counting units elements are implemented by a program running on a computer, and displayed and manipulate by a user on a computer display with a graphic user interface.

23. A method of teaching mathematical concepts to a person, including the steps of:
- providing the person with a plurality of block elements and at least one block element container, said at least one block element container for holding a predetermined number of block elements, and comprising two identical parts, said two identical parts engaging and forming a complete unit only when said predetermined number of block elements are contained within;
- instructing the person to organize said plurality of block elements and at least one block element container, and provide a count for the number of block elements the person has.

24. The method of claim 23 further including the steps of:
- providing the person with an additional number of block elements, and instructing the person to combine and organize all of said block elements and at least one block element container, and provide a count for the number of block elements the person now has.

25. The method of claim 23 further including the steps of:
- after the person has provided said count for the number of block elements the person has, instructing the person to separate out a certain number of block elements and then provide a count for the number of remaining block elements the person now has.

26. A mathematical teaching apparatus comprising:
- a plurality of first block elements, each of said plurality of first block elements having a dimension of $1 \times R \times R^2$;
- a plurality of second larger block elements, each of said plurality of second larger block elements having a dimension of $R \times R^2 \times R^3$; and
- at least one third larger block elements, having a dimension of $R^2 \times R^3 \times R^4$;
- wherein R is the third root of a predetermined number N
- wherein N of a first size of said block elements, when placed in a row, are congruent to a next larger size block element.

27. A mathematical teaching apparatus comprising:
- a plurality of elements representing single counting unit elements;
- at least one N counting unit element, said N counting element replicating the same shape as said plurality of single counting unit elements, wherein N of said single counting unit elements will fit inside said N counting unit elements, and said N counting unit element provides an indication when exactly N of said single counting unit elements are contained within,
- wherein said N counting unit element is a unit only when N of said single counting unit elements are contained within.

28. The mathematical teaching apparatus of claim 27, further including:
- at least one $N^2$ counting unit element, said $N^2$ counting unit element replicating the same shape as said plurality of single counting unit elements and said N counting unit element, wherein N of said N counting unit elements will fit inside one of said $N^2$ counting unit elements, and said $N^2$ counting unit element provides an indication when exactly N of said N counting unit elements are contained within,
- wherein said $N^2$ counting unit element is a unit only when N of said N counting unit elements are contained within.

29. The mathematical teaching apparatus of claim 28, wherein N is ten.

30. The mathematical teaching apparatus of claim 28, wherein said plurality of single counting unit elements, a plurality of N counting unit elements and said at least one $N^2$ counting unit element are implemented by a program running on a computer, and displayed and manipulated by a user on a computer display with a graphic user interface.

31. The mathematical teaching apparatus of claim 27, wherein N is ten.

32. The mathematical teaching apparatus of claim 27, wherein said plurality of single counting unit elements and said at least one N counting unit element are implemented by a program running on a computer, and displayed and manipulated by a user on a computer display with a graphic user interface.

* * * * *